United States Patent [19]
Barrett

[11] Patent Number: 6,043,735
[45] Date of Patent: Mar. 28, 2000

[54] EXIT ILUMINATOR ASSEMBLY FOR A MOTOR VEHICLE

[75] Inventor: Robert R. Barrett, Lexington, Mich.

[73] Assignee: Amerisafe Corporation, Clinton Township, Mich.

[21] Appl. No.: 09/003,929

[22] Filed: Jan. 7, 1998

Related U.S. Application Data

[60] Provisional application No. 60/035,793, Jan. 9, 1997.

[51] Int. Cl.[7] ....................................... B60Q 1/00
[52] U.S. Cl. ...................... 340/436; 180/271; 340/425.5; 340/438; 362/61
[58] Field of Search ............................. 340/438.439, 457, 340/425.5, 428, 430, 436, 332; 362/61, 80; 180/89.1, 313, 271

[56] References Cited

U.S. PATENT DOCUMENTS

| | | | |
|---|---|---|---|
| 4,122,371 | 10/1978 | Talmage et al. | 315/84 |
| 4,365,285 | 12/1982 | Brundidge | 362/75 |
| 5,581,230 | 12/1996 | Barrett | 340/332 |
| 5,709,453 | 1/1998 | Krent et al. | 362/80 |

*Primary Examiner*—Brent A. Swarthout
*Attorney, Agent, or Firm*—Bliss McGlynn, P. C.

[57] ABSTRACT

An exit illumination assembly for a motor vehicle includes an occupant compartment, at least one door having a door handle, and a restraint system having a restraint release mechanism. The exit illumination assembly includes a control unit for sensing a condition suitable for exiting the occupant compartment of the motor vehicle. The exit illumination assembly also includes an illuminator electrically connected to the control unit. The illuminator illuminates either the door handle or the restraint release mechanism when the control unit senses the condition suitable for exiting the occupant compartment.

19 Claims, 1 Drawing Sheet

EXIT ILUMINATOR ASSEMBLY FOR A MOTOR VEHICLE

CROSS-REFERENCE TO RELATED APPLICATION(S)

The present invention claims the priority date of copending United States Provisional Patent Application Ser. No. 60/035,793, filed Jan. 9, 1997.

BACKGROUND OF THE INVENTION

1. Field of the Invention

The present invention relates generally to illuminators and, more particularly, to an exit illuminator assembly for a motor vehicle.

2. Description of the Related Art

In certain situations, occupants in an occupant compartment of a motor vehicle need to exit the occupant compartment. At times, it is difficult to find the seat belt restraint release and/or the door handle due to the low levels of ambient light, unfamiliarity with the motor vehicle, and/or confusion resulting from an accident with the motor vehicle. An example of an illuminated door handle assembly is disclosed in commonly assigned U.S. Pat. No. 5,581,230, entitled "Illuminated Door Handle Assembly". As in the illuminated door handle assembly, there is a need in a motor vehicle to provide illumination for low light and emergency situations. Therefore, there is a need in the art to provide an exit illuminator assembly for a motor vehicle that offers illumination if conditions are suitable for exiting the vehicle.

SUMMARY OF THE INVENTION

It is, therefore, one object of the present invention to provide illumination of an interior door handle for an occupant compartment of a motor vehicle.

It is another object of the present invention to provide illumination of a seat belt restraint release mechanism for an occupant compartment of a motor vehicle.

It is still another object of the present invention to provide illumination in a motor vehicle if conditions are suitable for exiting the motor vehicle.

To achieve the foregoing objects, the present invention is an exit illumination assembly for a motor vehicle including an occupant compartment, at least one door having a door handle, and a restraint system having a restraint release mechanism. The exit illumination assembly includes a control unit for sensing a condition suitable for exiting the occupant compartment of the motor vehicle. The exit illumination assembly also includes an illuminator electrically connected to the control unit. The illuminator illuminates either the door handle or the restraint release mechanism when the control unit senses the condition suitable for exiting the occupant compartment.

One advantage of the present invention is that an exit illumination assembly is provided for an occupant compartment of a motor vehicle. Another advantage of the present invention is that the exit illuminator assembly has the ability to quickly identify the door handle and the release mechanism for the restraint system. Still another advantage of the present invention is that in the exit illumination assembly, power is conserved by only illuminating the door handle or release mechanism for the restraint system if conditions are right to exit the vehicle.

Other objects, features and advantages of the present invention will be readily appreciated as the same becomes better understood after reading the subsequent description taken in conjunction with the accompanying drawing.

DESCRIPTION OF THE PREFERRED EMBODIMENT(S)

Figure 1:
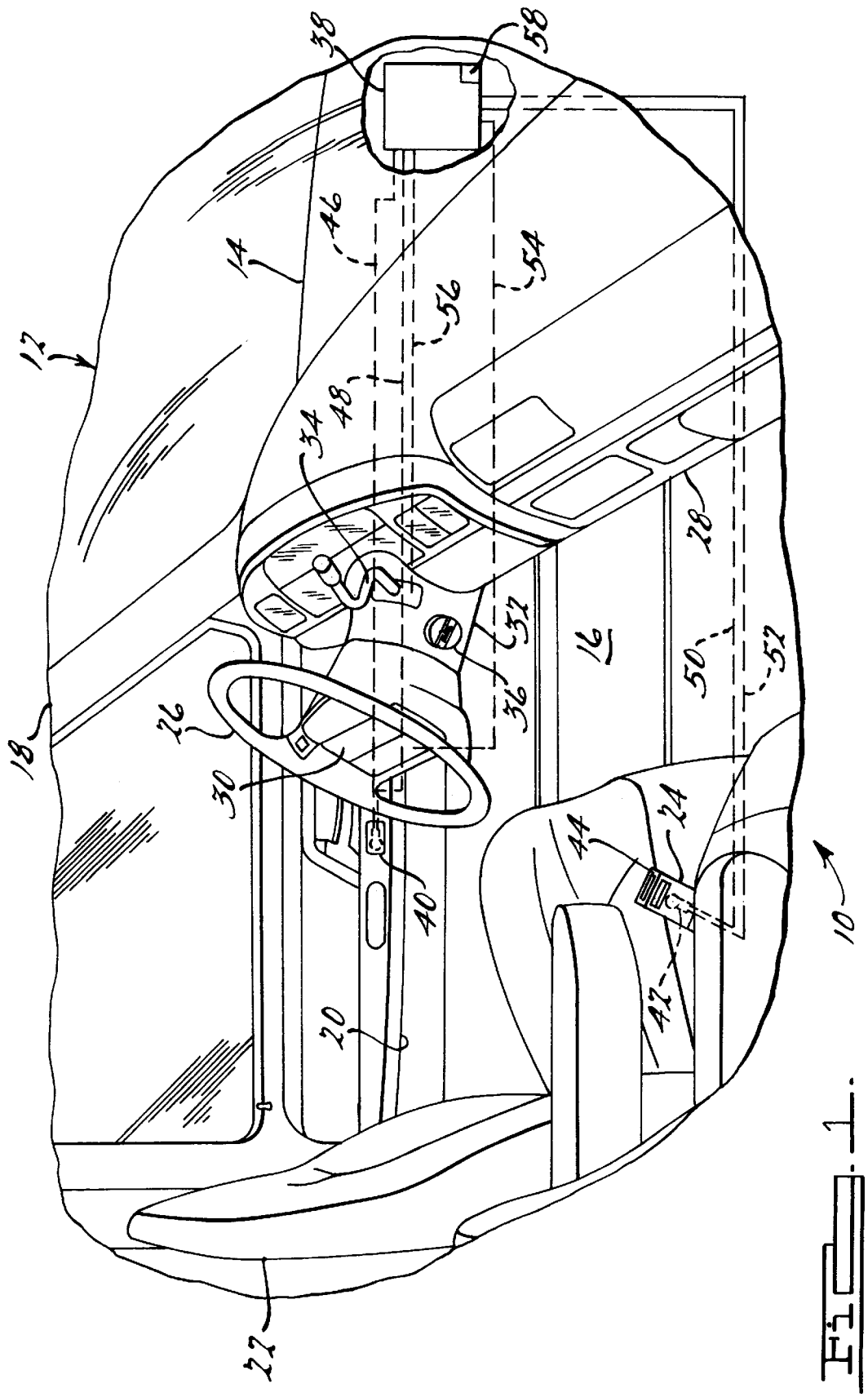
FIG. 1 is a perspective view of a motor vehicle, partially cut away, incorporating one embodiment of the present invention.

Referring to the drawing, one embodiment of an exit illumination assembly, according to the present invention, is generally indicated at 10 in FIG. 1. The exit illumination assembly 10 is incorporated into a motor vehicle 12 having an engine compartment 14 and occupant compartment 16. The occupant compartment 16 is accessible via a door 18 having an interior door handle 20. The occupant compartment 16 further includes a seat 22 in which an occupant, namely the driver, may sit. A restraint system is represented by a portion of a release mechanism, for example, a belt receiving clasp 24. A steering wheel 26 extends out from an instrument panel 28 in the occupant compartment 16 and includes an air bag 30. The steering wheel 26 extends through the occupant compartment 16 into the engine compartment 14 via a steering column 32. The steering column 32 includes a shifting lever 34 used to control a transmission (not shown) of the motor vehicle 12. A key hole 36 extends into the steering column 32 representing the ignition system. It should be appreciated that at least a portion of the door handle 20 and receiving clasp 24 may be fabricated from a light transmitting material that is transparent or translucent.

The exit illumination assembly 10 includes a control unit 38. The control unit 38 may be a microprocessor or a portion of an engine control unit (not shown), as should be appreciated by those skilled in the art. The control unit 38 receives inputs from the air bag system 30 through lead lines 54 and/or the transmission through lead line 56, represented by the shifting lever 34. From the inputs received thereby, the control unit 38 determines whether conditions are suitable for exiting the occupant compartment 16. A non-exhaustive list of such conditions include, but are not limited to, when the vehicle 12 is in park shortly after the ignition system is turned off, or when an accident of the motor vehicle 12 has occurred resulting in the deployment of the air bag 30. The control unit 38 provides power to an illuminator 40, such as a light bulb or a fiber optic cable, which illuminates the interior door handle 20 or a portion thereof. It should be appreciated that an example of such a fiber optic cable is disclosed in U.S. Pat. No. 5,581,230, the disclosure of which is hereby incorporated by reference.

The control unit 38 may also provide power to a second illuminator 42, such as a light bulb or fiber optic cable, which would illuminate the release button 44 of the receiving clasp 24. It should be appreciated by those skilled in the art that the illuminator 42 may illuminate something other than the release button 44 or, in the alternative, a portion of the release button 44. Power in the form of direct current or alternating current (A/C) to direct current (D/C) is provided to the illuminators 40, 42 from the control unit 38 through lead lines 46, 48, 50, 52. A timer 58 may be used by the control unit 38 to determine when the illuminators 40, 42 should be turned off. The illuminators 40, 42 may be standard incandescent bulbs, fiber optic cables or any type of illuminators suitable for the motor vehicle environment.

The present invention has been described in an illustrative manner. It is to be understood that the terminology which has been used is intended to be in the nature of words of description rather than of limitation.

Many modifications and variations of the present invention are possible in light of the above teachings. Therefore, the present invention may be practiced other than as specifically described.

What is claimed is:

1. An exit illumination assembly for a motor vehicle including an occupant compartment, at least one door having a door handle, and a restraint system having a restraint release mechanism, said exit illumination assembly comprising:

a control unit for sensing a condition suitable for exiting the occupant compartment of the motor vehicle when an accident of the motor vehicle has occurred; and an illuminator electrically connected to the control unit, said illuminator illuminating either one of the door handle and the restraint release mechanism when the control unit senses said condition suitable for exiting the occupant compartment.

2. An exit illumination assembly for a motor vehicle including an occupant compartment, at least one door having a door handle, and a restraint system having a restraint release mechanism, said exit illumination assembly comprising:

a control unit for sensing a condition suitable for exiting the occupant compartment of the motor vehicle;

an illuminator electrically connected to the control unit, said illuminator illuminating either one of the door handle and the restraint release mechanism when the control unit senses said condition suitable for exiting the occupant compartment; and wherein said control unit receives an input from either one of an air bag system or a transmission to determine if the condition suitable for exiting the occupant compartment is sensed.

3. An exit illumination assembly for a motor vehicle including an occupant compartment, at least one door having a door handle, and a restraint system having a restraint release mechanism, said exit illumination assembly comprising:

a control unit for sensing a condition suitable for exiting the occupant compartment of the motor vehicle;

an illuminator electrically connected to the control unit, said illuminator illuminating either one of the door handle and the restraint release mechanism when the control unit senses said condition suitable for exiting the occupant compartment; and wherein the condition suitable for exiting the occupant compartment is when an air bag is deployed.

4. An exit illumination assembly as set forth in claim 1 wherein at least a portion of the door handle is fabricated from a light transmitting material.

5. An exit illumination assembly as set forth in claim 1 wherein at least a portion of the restraint release mechanism is fabricated from a light transmitting material.

6. An exit illumination assembly as set forth in claim 1 wherein said illuminator is a fiber optic cable.

7. An exit illumination assembly as set forth in claim 1 wherein the control unit includes a timer for turning off said illuminator after a predetermined period of time.

8. An exit illumination assembly for a motor vehicle including an occupant compartment, at least one door having a door handle, and a restraint system having a restraint release mechanism, said exit illumination assembly comprising:

a control unit for sensing a condition suitable for exiting the occupant compartment of the motor vehicle when an accident of the motor vehicle has occurred; and a first illuminator and a second illuminator electrically connected to the control unit and receiving power in the form of alternating current (A/C) to direct current (DC) from said control unit, said first illuminator illuminating the door handle and a second illuminator illuminating the restraint release mechanism when the control unit senses the condition suitable for exiting the occupant compartment.

9. An exit illumination assembly for a motor vehicle including an occupant compartment, at least one door having a door handle, and a restraint system having a restraint release mechanism, said exit illumination assembly comprising:

a control unit for sensing a condition suitable for exiting the occupant compartment of the motor vehicle;

a first illuminator and a second illuminator electrically connected to the control unit, said first illuminator illuminating the door handle and a second illuminator illuminating the restraint release mechanism when the control unit senses the condition suitable for exiting the occupant compartment; and wherein said control unit receives an input from either one of the air bag system or the transmission to determine if the condition suitable for exiting the occupant compartment is sensed.

10. An exit illumination assembly as set forth in claim 8 wherein the condition suitable for exiting the occupant compartment is when the vehicle is in park shortly after an ignition system is turned off.

11. An exit illumination assembly for a motor vehicle including an occupant compartment, at least one door having a door handle, and a restraint system having a restraint release mechanism, said exit illumination assembly comprising:

a control unit for sensing a condition suitable for exiting the occupant compartment of the motor vehicle;

a first illuminator and a second illuminator electrically connected to the control unit, said first illuminator illuminating the door handle and a second illuminator illuminating the restraint release mechanism when the control unit senses the condition suitable for exiting the occupant compartment; and wherein the condition suitable for exiting the occupant compartment is when an air bag is deployed.

12. An exit illumination assembly as set forth in claim 8 wherein at least a portion of the door handle is fabricated from a light transmitting material.

13. An exit illumination assembly as set forth in claim 8 wherein at least a portion of the restraint system is fabricated from a light transmitting material.

14. An exit illumination assembly as set forth in claim 8 wherein either one of said first illuminator or said second illuminator is a fiber optic cable.

15. An exit illumination assembly as set forth in claim 8 wherein said control unit includes a timer for turning off said illuminator after a predetermined period of time.

16. An exit illumination assembly for a motor vehicle including an occupant compartment, at least one door having a door handle, and a restraint system having a restraint release mechanism, said exit illumination assembly comprising:

a control unit for sensing a condition suitable for exiting the occupant compartment of the motor vehicle;

an first illuminator and a second illuminator electrically connected to the control unit, wherein said control unit receives an input from either one of the air bag system or the transmission in determining if the condition suitable for exiting the occupant compartment is sensed;

said first illuminator illuminating a portion of the door handle fabricated from a light transmitting material and a second illuminator illuminating a portion of the restraint release mechanism fabricated from a light transmitting material if the control unit senses the condition suitable for exiting the occupant compartment; and said control unit including a timer for turning off either one of said first or second illuminator after a predetermined period of time.

17. An exit illumination assembly as set forth in claim 16 wherein the condition suitable for exiting the occupant compartment is when the vehicle is in park shortly after an ignition system is turned off.

18. An exit illumination assembly as set forth in claim 16 wherein the condition suitable for exiting the occupant compartment is when an air bag is deployed.

19. An exit illumination assembly as set forth in claim 16 wherein either one of said first illuminator or said second illuminator is a fiber optic cable.

* * * * *